United States Patent [19]

Cramer et al.

[11] Patent Number: 5,107,418
[45] Date of Patent: Apr. 21, 1992

[54] METHOD FOR REPRESENTING SCALAR DATA DEPENDENCES FOR AN OPTIMIZING COMPILER

[75] Inventors: Timothy J. Cramer, Pleasanton; David M. Cox, Livermore, both of Calif.

[73] Assignee: Supercomputer Systems Limited Partnership, Eau Claire, Wis.

[21] Appl. No.: 571,503

[22] Filed: Aug. 23, 1990

Related U.S. Application Data

[63] Continuation-in-part of Ser. No. 537,466, Jun. 11, 1990.

[51] Int. Cl.⁵ .............................................. G06F 9/44
[52] U.S. Cl. .............................. 395/700; 364/280.4; 364/280.5; 364/DIG. 1
[58] Field of Search ... 364/200 MS File, 900 MS File; 395/700

[56] References Cited

U.S. PATENT DOCUMENTS

| | | | |
|---|---|---|---|
| 4,642,764 | 2/1987 | Auslander | 364/200 |
| 4,710,872 | 12/1987 | Scarborough | 364/200 |
| 4,782,444 | 11/1988 | Munshi et al. | 364/200 |
| 4,843,545 | 6/1989 | Kikuchi . | |
| 4,847,755 | 7/1989 | Morrison et al. . | |

OTHER PUBLICATIONS

Aho, Sethi and Ullman, *Compilers: Principles, Techniques and Tools*, Addison-Wesley (1986), Chap. 10, pp. 585-722.

*Primary Examiner*—David Y. Eng
*Attorney, Agent, or Firm*—Patterson & Keough

[57] ABSTRACT

A method for representing scalar data dependencies for an optimizing compiler wherein a global scalar data dependence graph is created to represent all of the scalar objects in an entire program. The scalar data dependencies are represented as three chains: a use-definition chain (ud); a definition-use chain (du) or a definition-definition chain (dd), and is created for the entire program and is maintained during the entire compilation or assembly of the program. The method for determining scalar data dependences for the entire program starts by analyzing the scalar data dependences within each basic block, in a single pass, processes all definitions and uses of all non-array data objects in the basic block, including simple variables and complex data objects such as records, unions, pointers and procedure calls in the presence of aliasing. From these objects, information is collected, such as whether the data objects are upwardly or downwardly exposed, pointers, pointer aliases, aggregate objects, array objects, uses, definitions; whether they are calls, indirect uses, or indirect definitions.

7 Claims, 7 Drawing Sheets

METHOD FOR REPRESENTING SCALAR DATA DEPENDENCES FOR AN OPTIMIZING COMPILER

RELATED APPLICATION

This application is a continuation-in-part of an application filed in the U.S. Patent and Trademark Office on Jun. 11, 1990, entitled INTEGRATED SOFTWARE ARCHITECTURE FOR A HIGHLY PARALLEL MULTIPROCESSOR SYSTEM, Ser. No. 07/537,466, which is assigned to the assignee of the present invention and which is hereby incorporated by reference in the present application.

TECHNICAL FIELD

The present invention relates generally to software compiler technology. More particularly, the present invention relates to a method for constructing a scalar data dependence graph of a program for use by a compiler during code optimization.

PRIOR ART

As described in Aho, Sethi and Ullman, *Compilers: Principles, Techniques and Tools*, Addison-Wesley (1986), Chpt. 10, pgs. 585-722, optimizing compilers in the prior art create a form of scalar data dependence graph in order to perform optimizations on well-formed loops of a program that do not contain procedure calls or dereferences of pointers.

One of the reasons optimizing compilers in the prior art do not process loops that include procedure calls or dereferences of pointers is because, according to traditional methods, these events must be treated as though they reference all variables in the program. The result of attempting to include procedure calls and dereferences of pointers using the present techniques would be a scalar data dependence graph that is slow to construct and too large for available memory. Consequently, optimizing compilers in the prior art perform special-purpose optimizations only on well-formed loops.

Because the construction of such prior art data dependence graphs consumes a significant amount of memory space, most prior art optimizing compilers abandon these graphs after the graphs have served their purpose of allowing optimization of a particular local loop. In doing so, prior art compilers do not create a global scalar data dependence graph that is active for the entire program. As a result, later optimizations that could have used this graph are less efficient or may not be performed on certain portions of the program.

Another problem with the prior art optimizing compilers of the kind described in Aho, Sethi and Ullman, *Compilers: Principles, Techniques and Tools*, is that they do not handle aggregate variables (i.e., variables of aggregate type such as strings, records, and unions). This severely limits the kinds of optimizations that these compilers can perform on the intermediate representation of certain kinds of high level programming languages that utilize these types, for example C programming language.

Although the scalar data dependence graphs created by the prior art optimizing compilers have enabled special-purpose optimization to be performed on well-formed loops, there is a need for new method of representing scalar data dependences that allows for the creation of a global scalar dependence graph which deals with all types of scalar objects in a program, including pointers, procedure calls, and aggregate variables.

SUMMARY OF INVENTION

The present invention provides a method for representing scalar data dependencies for an optimizing compiler wherein a global scalar data dependence graph is created to represent all of the scalar objects in an entire program. Unlike prior art scalar data dependence graphs, the scalar data dependencies are represented as three chains: a use-definition chain (ud); a difinition-use chain (du) or a definition-definition chain (dd). Also, unlike prior art scalar data dependence graphs, the representation of scalar data dependences is created for the entire program and is maintained during the entire compilation or assembly of the program. Many types of optimizations, including: scheduling, register allocation, loop invariant expression identification, loop induction variable identification, array dependence graph construction, redundant and unused store elimination, and loop invariant code hoisting optimizations all use the information collected during scalar data dependence graph construction so that information collection does not happen at each optimization.

The method of the present invention for determining scalar data dependences for the entire program starts by analyzing the scalar data dependences within each basic block. The present invention is unique in its ability to process in a single pass all definitions and uses of all non-array data objects in the basic block, including simple variables and complex data objects such as records, unions, pointers and procedure calls in the presence of aliasing. From these objects the present invention collects information, such as whether the data objects are upwardly or downwardly exposed, pointers, pointer aliases, aggregate objects, array objects, uses, definitions; whether they are calls, indirect uses, or indirect definitions. The present invention also calculates exposed use and clear bit vectors.

To calculate a kill set for each basic block, conservative methods are applied to expand the kill traditional definition of the set, without requiring a control flow algorithm to be applied. The algorithm that makes scalar data dependence connections between basic blocks looks for all upward exposed uses and definitions and, using the IN set for the basic block, determines which definitions outside the basic block reach each local use or definition. It also looks at all downward exposed uses and, using the OUT set (obtained from the Reaching Uses algorithm), determines which definitions outside the basic block this local use can reach.

To handle dereferences of unresolved pointers, the present invention groups pointer dereferences into "sets" or "classes" of dereferences, and then creates local data dependences based on these classes. The local scalar data dependences for each set or class of dereferences is then analyzed in the same manner as a standard scalar data dependency.

Accordingly, it is an objective of the present invention to provide a method for representing local and global scalar data dependencies through the creation of a scalar data dependence graph that represents all of the scalar objects in a program.

Another object of the present invention is the use of graph reduction techniques during the single pass through the scalar data dependence graph to consolidate side effects of procedure calls and pointer dereferences in the scalar data dependence graph.

A further object of the present invention is to collect additional scalar information vital to subsequent optimizations, including "clear" and "exposed use" information and the affects of pointer dereferences.

DETAILED DESCRIPTION OF THE PREFERRED EMBODIMENT

Scalar data dependence analysis is a well known technique used by optimizing compilers for optimizing high-level language computer programs. A working understanding of the concepts and terminology involved in scalar data dependence analysis is assumed for purposes of describing the preferred embodiment of the present invention. For an excellent discussion of the present state of the art of scalar data dependence analysis, reference is made to Aho, Sethi and Ullman, *Compilers: Principles, Techniques and Tools*, Addison-Wesley (1986), Chpt 10, pgs. 585-722, which is incorporated herein by reference.

Figure 1:
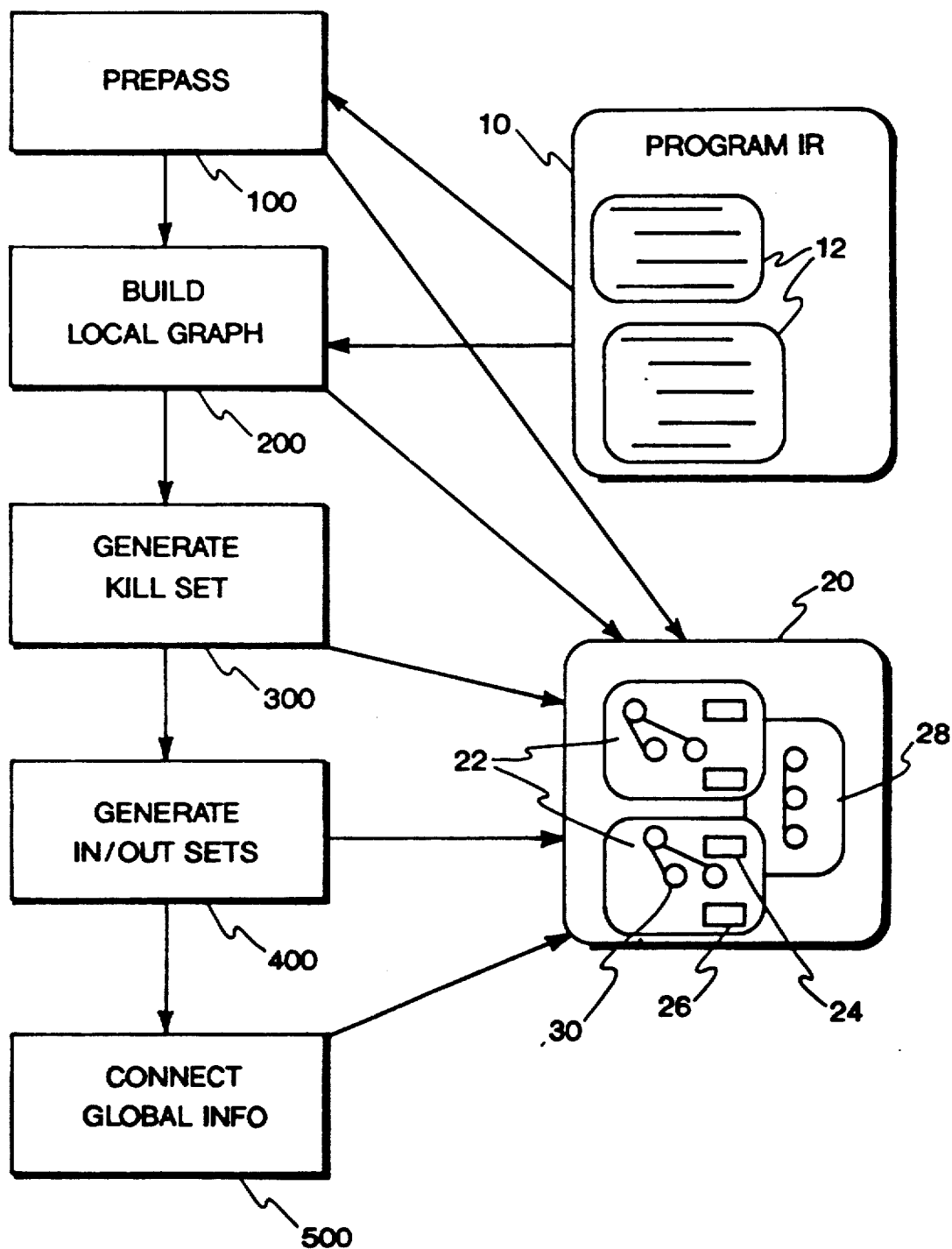
FIG. 1 is an overview of the build process for the scalar data dependence graph.

FIG. 1 presents an overview of how the preferred embodiment creates a scalar data dependence graph 20 in accordance with the present invention. A prepass 100 is made over an intermediate representation of the program 10 which is generated by the front-end of the compiler to gather preliminary information to be stored in the global scalar data dependence graph 20. In the preferred embodiment, the intermediate representation 10 is an integrated hierarchical graphical common intermediate representation wherein multiple front-ends for multiple high-level languages are capable of generating a single common intermediate representation. It will be recognized, however, that the present invention may be used with any type of intermediate representation, as well as an assembly or low-level representation of the program, used by the optimizing compiler. At Build Local Graph 200, a local scalar data dependence graph 22 of the type described hereinafter is completed for each basic block 12 of the program 10. At Generate KILL Set 300, a KILL Set 24 is generated for each basic block. Using the KILL set, an IN/OUT set 26 is generated at Generate IN/OUT Sets 400. Finally, the information for each of the basic block 12 is interrelated and the global scalar data dependence graph 28 is completed at Perform Global Links 500.

Figure 2:
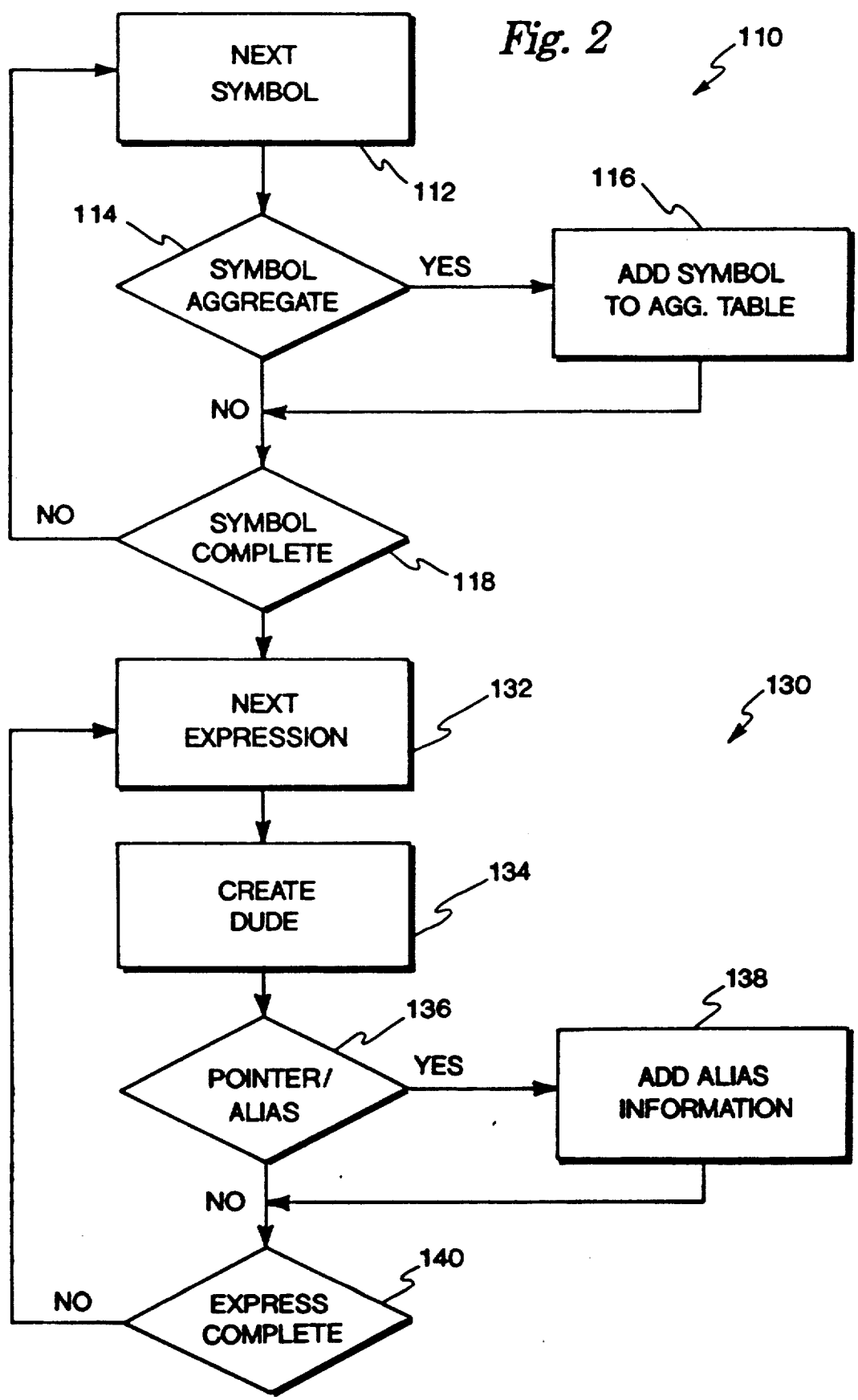
FIG. 2 is a block diagram of the prepass operation.

The prepass 100, as shown in FIG. 2, gathers information needed to create a data dependence graph 20 in one pass over the intermediate representation of the program 10. First, at Process Symbol Information 110, all of the symbols referenced in the intermediate representation 10 are examined for aggregate types. The symbols in the program 10 are examined one at a time at step 112. At step 114, the type information for each symbol is examined to determine if the symbol is an aggregate type (i.e., variables of aggregate type such as strings, records, and unions). If the symbol is an aggregate type, then at step 116 an entry in an Aggregate Table is created to hold additional information about this symbol. Finally, step 118 checks to see whether all of the symbols for the program have been checked.

When Process Symbol Information 110 is completed, all of the expression nodes in the intermediate form are examined by Process Expression Information 130. Again, the all of the expressions for the entire program are examined one at a time via step 132. At step 134, a dependence (DUDe) node 30 is created for each variable reference or subroutine/function call. A DUDe node 30 is a placeholder for each unique use or definition of a variable to which DUDe chains are attached. A DUDe chain is an integrated combination of the du-chain, the ud-chain, and the dd-chains. Although each of these types of chains (du-chain, ud-chain, and dd-chain) are known in the prior art, the present invention integrates all three chains in a common data structure for identifying the complete definition and use relationships for a variable. If it is determined at step 136 that an expression is a pointer dereference of some sort, then additional information is added to the DUDe node 30 at step 138 identifying the specific kind of the pointer. This information is also added to the DUDe node 30 if it is determined that the variable reference could potentially be an alias for a pointer dereference. So that the type of DUDe nodes 30 can easily be identified when constructing the local scalar data dependence graph, DUDe nodes are categorized by function as DEFINITION, USE, USE/DEFINITION, CALL, INDIRECT USE, or INDIRECT DEFINITION. DUDe nodes 30 are then further categorized as one of four data types: BASIC, ARRAY, AGGREGATE, or OTHER. For a detailed description of the data structure for the preferred embodiment of the DUDe node 30 of the present invention, reference is made to Appendix B of this specification. Although the preferred data structure for representing the DUDe node 30 is presented in terms of data definitions for C programming language, it will be understood by those skilled in the art that many different forms of data structures could be utilized to represent the dependence node and still be within the scope of the present invention.

Figure 3:
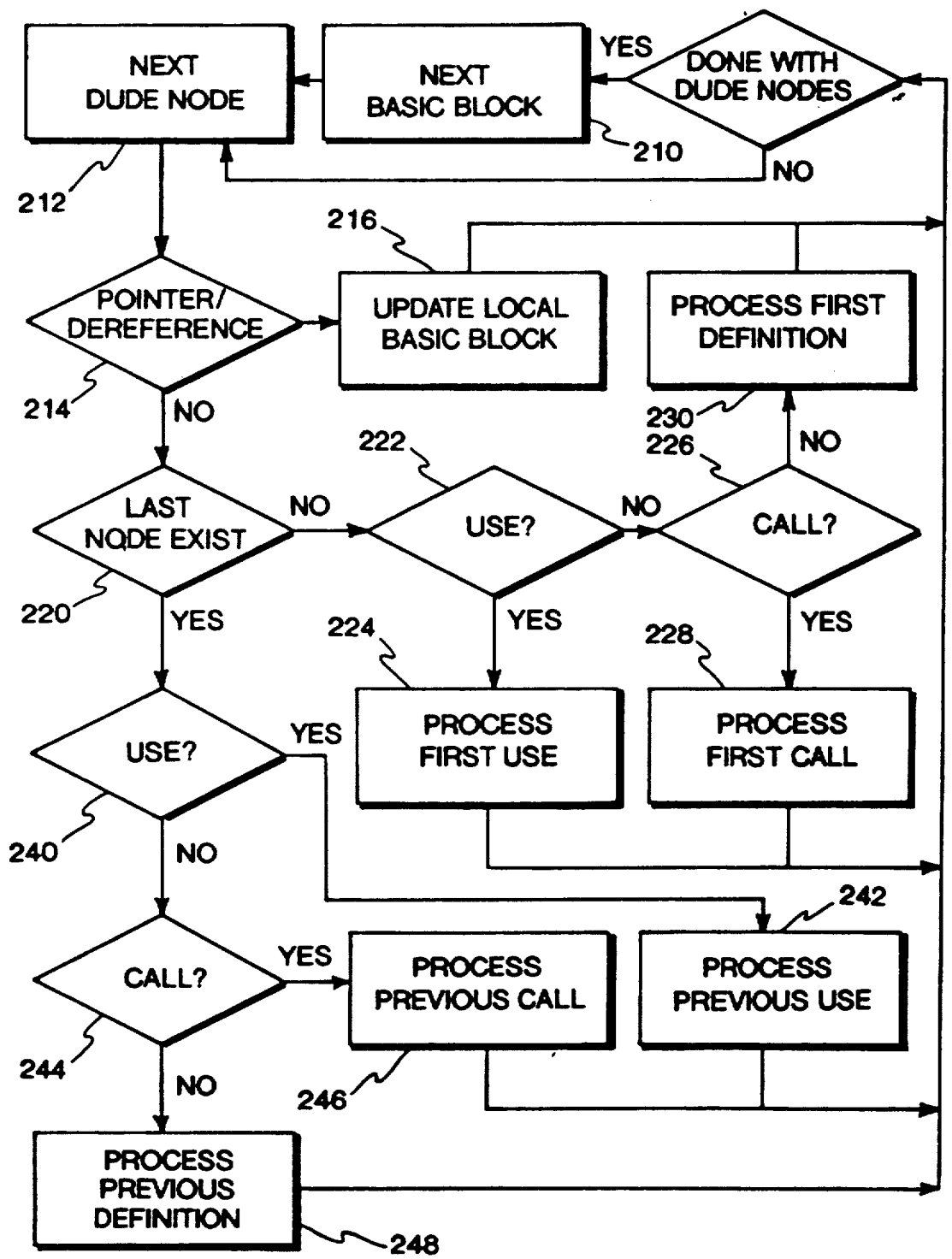
FIG. 3 is a block diagram representing the building of a subgraph associated with a basic block.

Referring now to FIG. 3, Build Local Graph 200 will be described. Building the local graph 26 not only constructs scalar dependences, but also gathers a large amount of other information used in building the global graph 20 that may be used during other phases of optimization. For example, clear and exposed use bit vectors are created for use in invariant expression detection, code hoisting, and live variable calculation (which in turn is used for redundant store elimination and register allocation).

At step 210, all of the basic blocks 12 for the program 10 are examined one at a time. For each basic block 12, each of the DUDe nodes 30 that were created by the prepass 100 for that block are examined in lexical order. By attaching the last known reference to each symbol node, simultaneous tracking of the dependences between all variables in a basic block is possible.

A problem occurs when a dependence graph is constructed to be completely accurate—namely, it can become too large. The present invention avoids this problem by using two special methods of graph reduction. First, it uses the CALL category to identify certain dependence nodes, thereby preventing the creation of many dependence nodes representing potential definitions/uses of global variables by the called procedure. Second, it performs unresolved pointer dereference analysis on a basic block basis only, making it conservative for the code scheduling phase (its only consumer), but creating the pointer dereference portion of graph only at the time when code scheduling needs it and throwing away that portion of the graph after code scheduling. Thus, if the dependence node is a pointer dereference node, the node is not connected during this phase of local graph construction. This is accomplished at step 214 by checking to see if the current DUDe is a pointer or dereference dependence node. If so, then local basic block information and some dependence node information concerning the pointer dereference is registered at step 216. Specifically, the upward and downward exposed flags are set for the dependence node, and, if the pointer dereference dependence node depicts an indirect definition, the basic block's clear bit vector is updated to include the fact that all pointer aliases have been potentially defined.

If the current reference is not a pointer reference or an aggregate object, a check is made at step 220 to determine whether the current variable has been referenced previously in the current block. If it has not, then this must be the first reference to this particular variable in this basic block. In this case, no data dependence connections need to be made, but information must be retained in case the variable is referenced at another point in the basic block. If step 222 determines that this is a USE, then both upward and downward exposed flags are set by Process First Use 224. Process First Use 224 also determines if this is an equivalenced or an aggregate use, and, if so, then another variable could affect this use, thereby deleting its "first-use" status. At step 226, a check is made to see if this is a CALL. If so, then the list of all global variables is run by Process First Call 228, and if it is determined that this call affects a USE of a previous global variable, then that USE is marked as not downward exposed. Any previous global variables that reach the CALL are deleted from the GEN set for the basic block. Finally, if the dependence node is not a USE, CALL, or pointer dereference, then it must be a definition and the standard check for equivalences and aggregate types is made at Process First Definition 230. Process First Definition performs the standard check in the same manner as process First use 224. The variable is added to the GEN set and marked as "not clear" in the block's clear bit vector.

If step 220 determines that the current variable has been previously referenced in this basic block, then the following steps are performed. First, a check is made to see if the last node was a USE at step 240. If it is, then the Process Previous Use 242 first checks to see if the current node is also a USE. If this is true, then the current node is marked as both upward and downward exposed, the index of the dependence node is marked in the upward exposed bit vector, and the uses are chained together as exposed uses. If the current node is not a USE, then it is either a CALL or a DEFINITION. The current node is processed by first adding it to the GEN set for the basic block and marking the clear bit vector as not clear, then looking at the exposed use chain for this symbol if it exists, unmarking the downward exposed flag in the use chain, and connecting the identified node to the current node (part of the use-definition chain).

If, however, the last node is not a USE as was tested at step 240, then a check is made to see if it is a CALL at step 244. If the last node is a CALL, then Process Previous Call 246 is performed. If not, then Process Previous Definition 248 is performed. Because the processes of Process Previous Call 246 and Process Previous Definition 248 are nearly identical, they will be combined in the following discussion with differences noted. First, as in the Process Previous Use 242, the current node is checked to see if it is a USE. If this is the case then this is simply the next use after the definition of a variable (part of the definition-use chain). The USE is marked a downward, but not upward exposed, and the DEFINITION and USE nodes are connected. If the current node is a CALL, then this is some form of variable that is affected by a subroutine/function call, namely as global variable or a variable that has had its address taken, and therefore could potentially be modified by the action of performing the subroutine/function call. In order to keep the scalar data dependence graph from growing too large, the last node that corresponds to the DEFINITION will not be connected to the current CALL node. In addition to recognizing that this call affects the global variable DEFINITION that was being processed above it, the last node is removed from the GEN set for the basic block, and all USEs between the two DEFINITIONs/CALLs have their downward exposed flags cleared. If the current and last node are both DEFINITIONs, they are connected together as part of the definition-definition chain, and if the current node is a DEFINITION, the USEs between it and the last DEFINITION/CALL are connected to it (as part of the use-definition chain).

If the prepass has determined that the current reference is an aggregate object at step 220, then, in general, more processing must be done. Equivalences and aggregates introduce the problem of some variables being defined fully, some only partially. In the case of Fortran, the simple situation is handling the equivalence of two simple variables, as in the following code fragment:

integer i,j
equivalence (i,j)

this states that variables 'i' and 'j' share the same space, however the equivalence of a multi-word variable (a variable stored in multiple words of memory) with two single word variables. For example:

real r1, r2
double precision d
common /realpieces/ r1,r2
equivalence (d,r1)

A partial definition of 'd' can occur if 'r1' or 'r2' is defined. This is handled quite easily by realizing when to stop processing certain definitions. The method is that if 'd' is defined, then a definition of 'r1' does not reset the processiang of 'd'. However, a definition of 'r1' followed by a definition of 'd' does completely redefine 'r1', thus the current definition of 'r1' would be moved to the definition of 'd'. Structure/union references in the C programming language are handled in exactly the same way, determining when a particular variable has completely redefined another.

Figure 4:
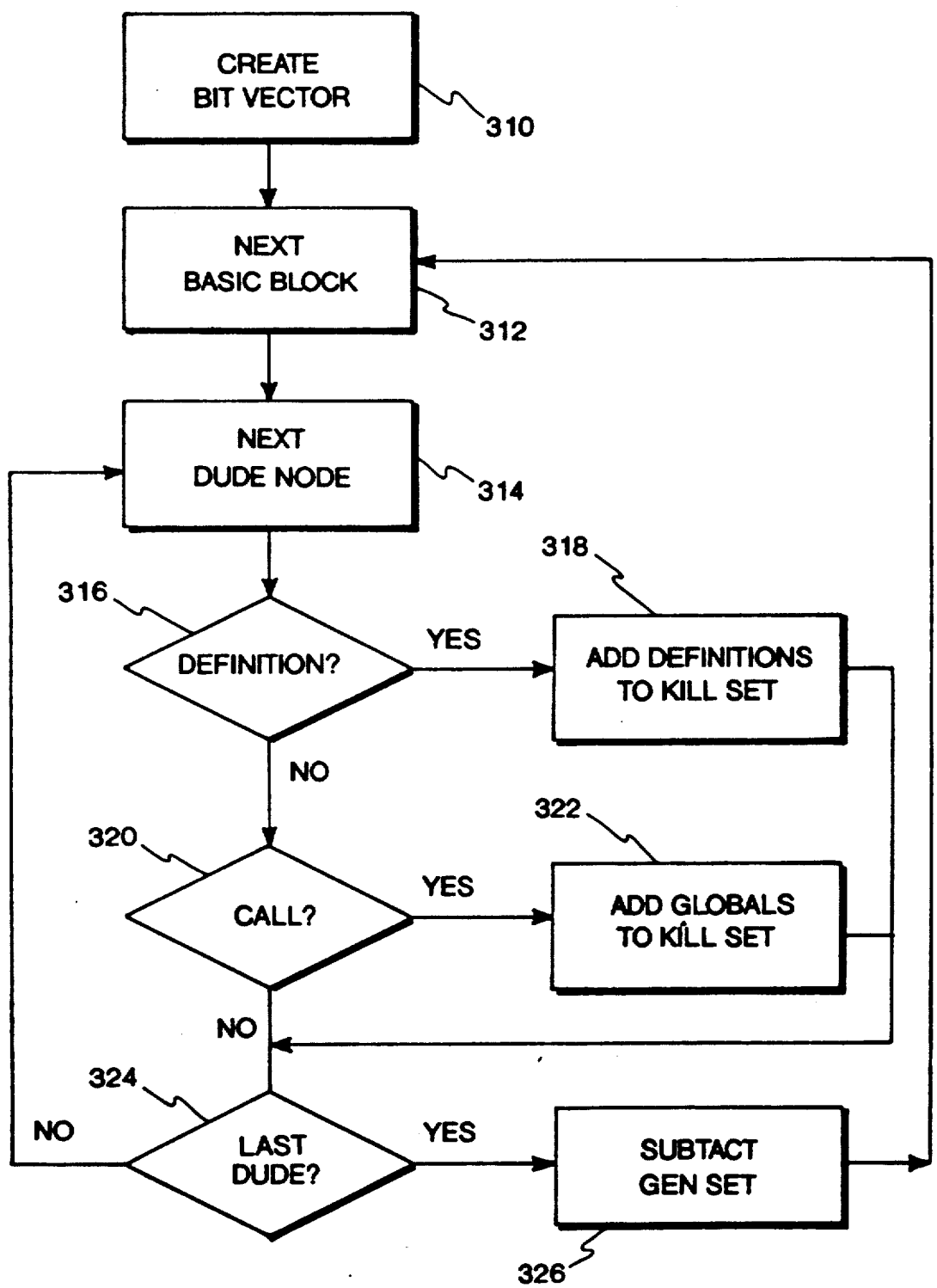
FIG. 4 is a block diagram of the generation of a KILL set.
Figure 5A:
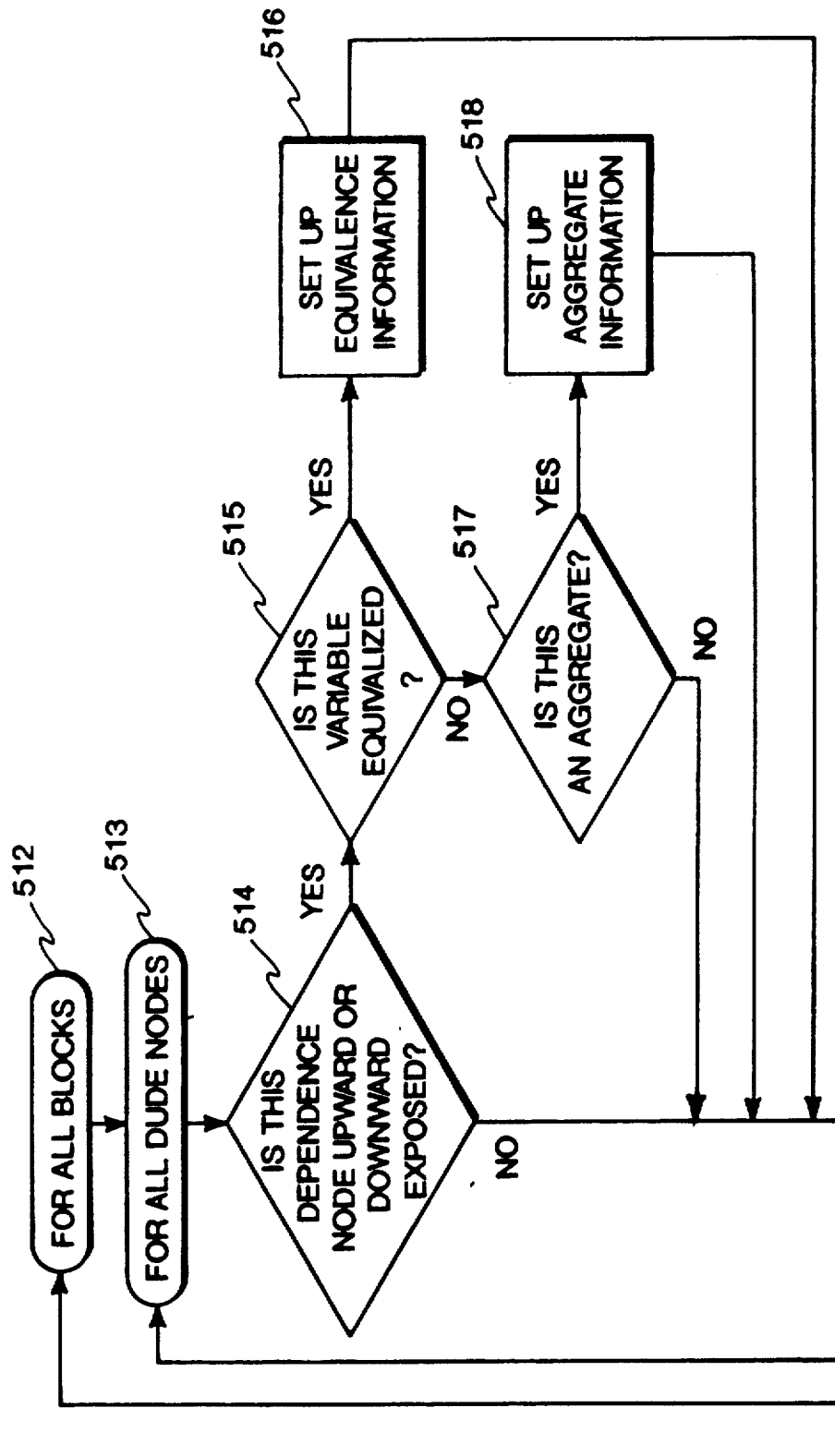
FIG. 5 (5(a) and 5(b)) is a block diagram of the process of connecting the dependence information among different basic blocks.
Figure 5B:
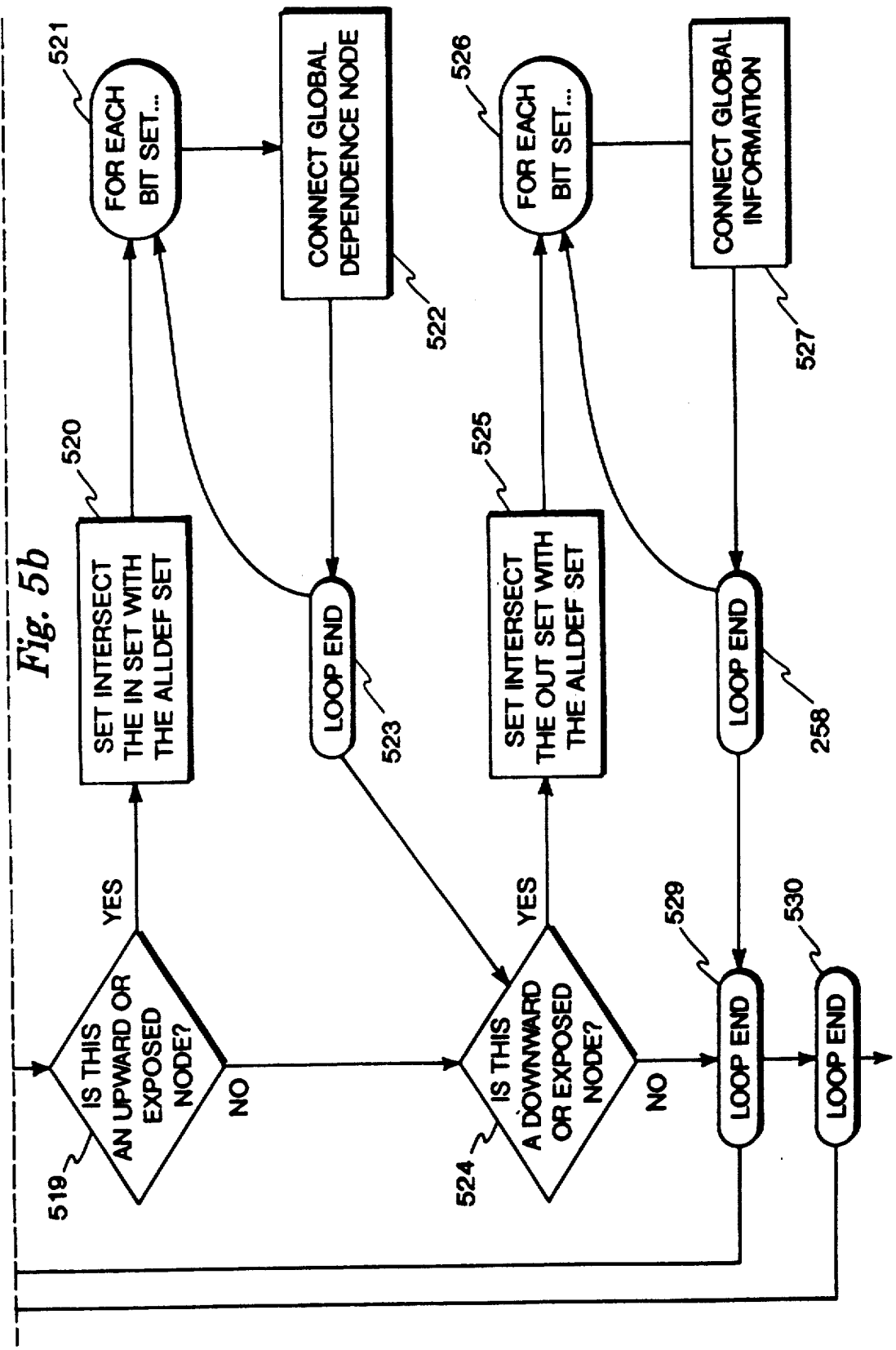

Referring now to FIG. 4, new techniques used by the present invention to simplify the creation of the KILL Set 24 will be described. In Aho, Sethi and Ullman, *Compilers: Principles, Techniques and Tools*, a KILL set is defined as the set of definitions that never reach the end of the current basic block, even if they reach the beginning. In the current invention, this definition has been expanded in a conservative manner to include "all definitions that are not generated by the current basic block". This conservative measure allows the calculation of "all definition" sets for each symbol. All symbols which are referenced in a basic block perform set union of their "all definitions" sets. This combination minus the GEN set for the block creates the KILL set which is now conservatively calculated. Generation of the KILL set of the present invention is quicker because flow of control in the program can effectively be ignored. If it were not ignored, each basic block's KILL set would have to be painstakingly developed by a flow control algorithm.

FIG. 4 shows the complete process for determining the KILL set 24. At Create Bit Vector 310, a bit vector definition is created for all global variable definitions. Then, a loop is created to examine each dependence node in each basic block by advancing to the next basic block at step 312 and advancing to the next DUDe Node within that basic block at step 314. Step 316 tests to see whether the DUDe node being examined is a definition. If so, then all definitions for the program are added to the KILL Set 24 at Add Definitions to KILL Set 318. If the DUDe node is a Call as tested at step 320, then all of the global variable and other calls are added to the KILL Set 24 at Add Globals to KILL Set 322. Step 324 checks to see if all the DUDe nodes in the current basic block have been examined. If so, then the original GEN Set is subtracted for the basic block at Subtract GEN Set 326 and the next basic block is examined.

The IN and OUT sets 26 as shown in FIG. 1 are generated by a well known method which is described in Aho, Sethi and Ullman, *Compilers: Principles, Techniques and Tools*. The method of Generate IN/OUT Sets 400 involves creating the IN and OUT sets associated with the reaching definitions algorithm and then saving the IN set (definitions that reach the beginning of the basic block). After this, the reaching uses algorithm is applied in order to calculate the OUT set (definitions reached from the end of the basic block).

Figure 5:
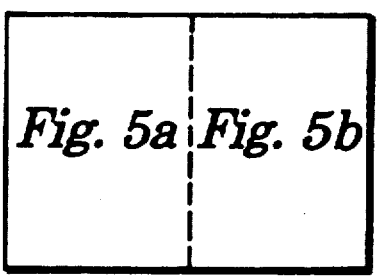

The final goal of scalar data dependence graph construction is connecting of all global data dependencies. The use of the graph 20 on a global basis may be for register allocation, induction variable identification, invariant variable detection, redundant store removal, unused store removal, and array data dependence graph construction. FIG. 5 shows the process involved in making all the global scalar data dependence connections. When creating the global graph a loop is performed for all basic blocks (Loop 512) and all dependence nodes for each basic block (Loop 513). As each dependence node is processed, equivalence and aggregate information is set up if necessary (Steps 514, 515, 516, 517, and 518). Then, if the dependence node is upward exposed (519), the IN set is intersected with the "all definitions" set derived earlier for this symbol (520) to find DEFINITIONS from other basic blocks which reach this upward exposed DEFINITION or USE. This information is then used to make all of the global connections involving definition-use and definition-definition chains (Steps 521, 522 and 523).

Then the dependence node is checked for the downward exposed flag (a node can be both upward and downward exposed) (Step 524). If it is, the process at Step 525 is carried out, involving the intersection of the OUT set of the basic block with the "all definitions" set derived earlier. This finds DEFINITIONS that this USE reaches. The global connections (steps 526, 527 and 528) are made in the same manner as described above for Steps 521, 522 and 523. Note that DEFINITIONs are not marked as downward exposed, this is because a downward exposed DEFINITION would be the same as the DEFINITION being in the GEN set. Steps 529 and 530 complete the loop control for each DUDE node and basic block.

Figure 6:
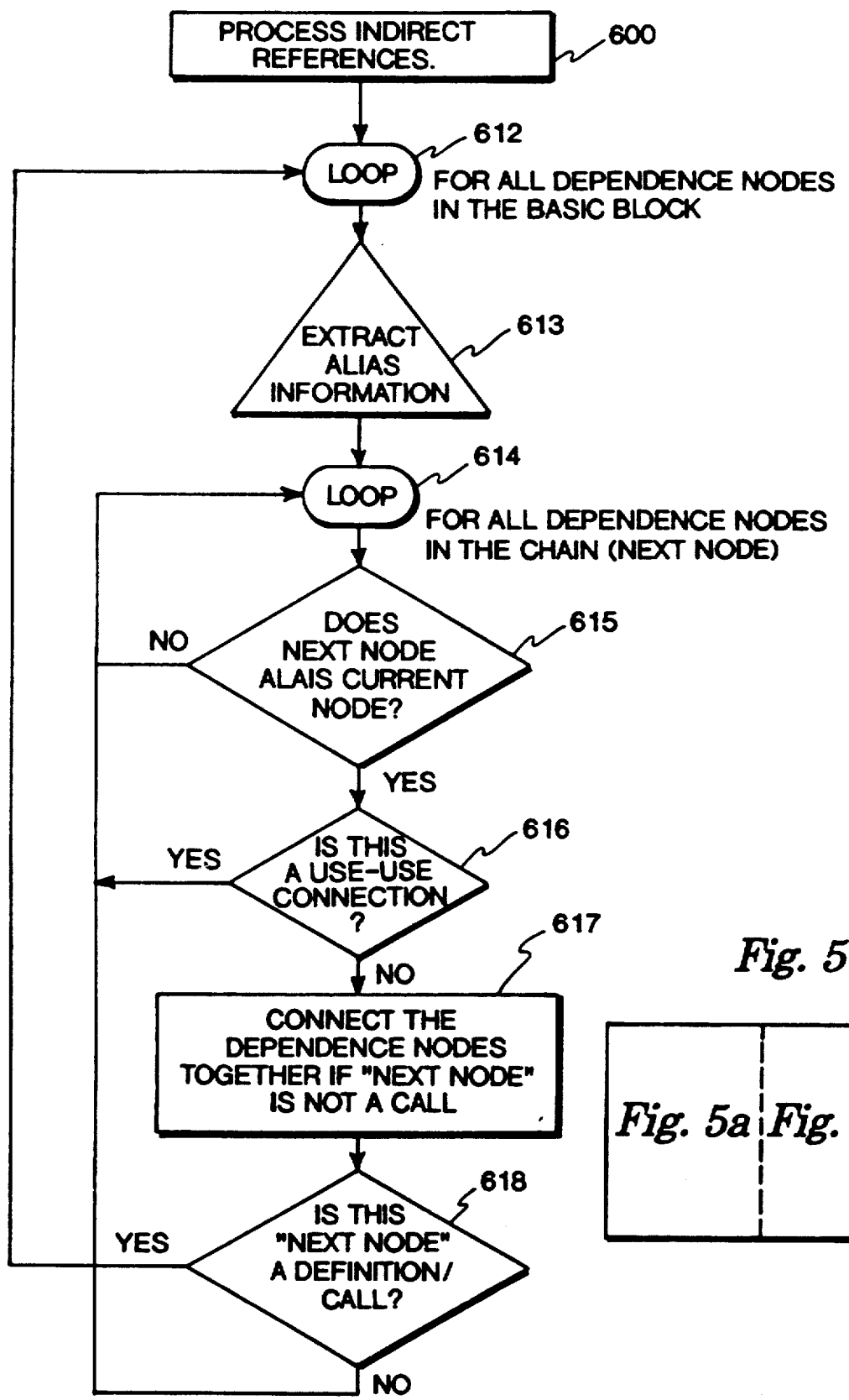
FIG. 6 is a block diagram of the processing of indirect references.

FIG. 6 shows the method employed for processing pointer dereferences, and how these are added to the data dependence graph. First of all, the compiler loops over all the dependence nodes in the basic block (Loop 612), examining each dependence node to check for pointer aliasing possibilities. If they exist, the compiler extracts alias information from the dependence node at Step 613, and then loops from the next dependence node in the chain until the end of the block (Step 614), looking at each node for potential aliasing to the current node (Step 615). When that alias is found, the compiler makes sure that the connection is legal (Step 616). If it is legal, the aliased node is connected to the current node as a data dependence at Step 617. At Step 618, if a definition or a call dependence node has been reached, the complier stops processiang this current alias and begins work on the next dependence node (back to Step 612). Otherwise, it continues processing the current alias (back to Step 614).

The present invention does not create a completely conservative scalar data dependence graph. In order to create a completely conservative scalar data dependence graph, every alias would have to be connected to every other alias in the entire program. But because this would cause the graph to grow exponentially with each pointer reference added to a C program, it is not an acceptable an option. Instead, as the method in FIG. 6 shows, definition of any alias A that potentially overwrite another alias B kills the definition of A. Basically this treats each pointer dereference as a set, and the definition of a set can kill previous uses and definitions of variables in that set.

IN THE DRAWINGS:

Formal drawings have been submitted under separate cover.

IN THE SPECIFICATION

In the specification please make the following changes:

Page 2, Line 14, delete "use" and insert -- have used--

Page 4, Line 1, delete "the" and insert -- a --;

Page 4, Line 2, after the word "the" insert -- kill --;

Page 4, Line 13, delete "create" and insert -- creates --;

Page 5, Line 24, after the word "over" insert -- an --;

Page 5, Line 24, after the words "program 10" insert -- which is --;

Page 6, Line 10, delete "figure" and insert -- Figure --;

Page 7, Line 16, delete "in the previously identified parent application entitled INTEGRATED SOFTWARE ARCHITECTURE FOR A HIGHLY PARALLEL MULTIPROCESSOR SYSTEM" and insert -- of this specification --;

Page 14, Line 23, insert the entire contents of Appendix B from the previously identified parent application entitled INTEGRATED SOFTWARE ARCHITECTURE FOR A HIGHLY PARALLEL MULTIPROCESSOR SYSTEM which was incorporated by reference and referred to at page 7, line 16.

APPENDIX B

DUDE           (Index: 8)

| | |
|---|---|
| parent | pointer to RVAL associated with this use of 'c' |
| next | DUDe node #9 |
| block | Block #4 |
| sym | symbol node corresponding to "c" |
| call_list_next | Since this is not a CALL, the NULL list |
| in | The list (Darc Nodes) consisting of pointers to DUDe Nodes 1,2,7 |
| out | The NULL list |
| ptr_ind_lvl | 0 |

| | |
|---|---|
| bv index | 0 (Undefined - This is not a definition |
| reference | USE |
| upward_x | TRUE |
| downward_x | TRUE |
| pointer | FALSE |
| ptr_ alias | (Undefined) |
| bound | (Undefined) |
| alias_type | (Undefined) |

DUDe lode Data Structure node_type du node_class nd kind (du) = DUDE NODE
    node-index nd_index_(du) =
        Index into the dude node array of the structure for this DUDe node.

dude_node dude_(node_type du)
        The entire dude node structure.

parent dude_parent_(node_type du)
        The parent expression node associated with this DUDe node.

next     dude_next_(node_type du)
        The next DUDe node.

previous    dude_previous_(node_type du)

The previous DUDe node.

block    dude_block_(node_type du)

The block node which contain this DUDe node.

sym    dude_sym_(node_type du)

The symbol node pointed to by this DUDe node.

in    dude_in_(node_type du)

The set of dependence arcs that is pointing into this DUDe Node.

out    dude out (node type du)

The set of dependence arcs that are pointing out of this DUDe Node.

ptr_ind_lvl    dude_ptr_ind_lvl (node type du)

The indirection level of the reference if it is a pointer.

bv_index    dude_by_index_(node_type du)

The bit vector index of the definition (LVAL) corresponding to this DUDe node.

kind    dude_kind_(node_type du)

An enumeration identifying the type of reference, USE, DEF, USE/DEF, INDIRECT USE, INDIRECT DEF, or CALL. An indirect use is something like "i = *p" which is a USE of 'p' and an INDIRECT USE OF '*p'. Indirect Def follows along the same lines, and CALL is: "fred (a,b,c,)" separate nodes are created for 'fred', this represents all global variables as defined and is only needed when IPA is not used.

| | |
|---|---|
| visited | dude_visited_(node_type du) |

A bit telling whether or not this DUDe was visited. Used only during alias analysis of local dependence graph construction.

| | |
|---|---|
| upward_x | dude_upward_x_use_(du) |

A bit telling whether or not this DUDe is upward exposed.

| | |
|---|---|
| downward_x | dude_downward_x_use (du) |

A bit telling whether or not this DUDe is a downward exposed use. IT IS NOT SET FOR DEFS!

| | |
|---|---|
| ty_qualifier | dude_ty_qualifier (du) |

B A S I C_TYPE - The symbol associated with this DUDe is a basic or an access type.
ARRAY TYPE - The symbol associated with this DUDe is an array.
STRUCTURE_TYPE - The symbol associated with this DUDe is a structure. OTHER TYPE - The symbol associated with this DUDe is some other (strange) type.

| | |
|---|---|
| ff_by_call | dude_aff_by_call_(du) |

A bit indicating whether or not this DUDe should be trated as global with respect to CALLs, in other words a CALL can affect it.

| | |
|---|---|
| is_subscripted | dude_is_subscripted (du) |

A bit indicating that the DUDe has a subscript operator associated with it;

different than the ty qualifier being an array because 'C' can have a subscripted pointer.

| | |
|---|---|
| multiple_alias | dude_multiple_alias (du) |
| | A bit indicating a multiple alias associated with the DUDe mode. |
| parameter | dude_parameter_(du) |
| | A bit indicating that the DUDe is attached to an actual parameter. |
| vector_mask | dude_vector_mask (du) |
| | Bit mask indicating the loops in which this reference's address varies (i.e. potentially forms a vector of values). |
| pointer | dude_pointer_(du) |
| | A bit telling whether or not this symbol associated with this DUDe is a pointer. |
| ptr_alias | dude_ptr_alias_(du) |
| | A bit, when set means this DUDe can be an alias for an unresolved pointer reference. |
| bound | dude_bound_(du) |
| | If ptr_alias is set, then this is the bound class for the DUDe node.
Weakly - This DUDe is a weakly bound type. (e.g. A 'C' integer pointer can point to an integer or unsigned integer).
Strongly - The DUDe is a strongly bound type. (e.g. A 'C' structure pointer can only point to things that are the same structure)
Unbound - This DUDe is unbound type. (e.g. a 'C' void pointer can point to anything it desires) |

| | |
|---|---|
| alias_type | dude_alias_type (du) |

>If ptr_alias is set, then this is the specific type of thing that it points to, if it is weakly bound it will be a class, if it is strongly bound it will be the node index of the type node that describes it, and if it is unbound it will be zero.

Darc Node 1~ta Structure:

>node_type da
>>node_class nd_kind_(da) = DARC_NODE
>>node_index nd_index_(da)
>>>Index into the darc node array of the structure for this dependence arc.
>>
>>darc_node darc_(da)
>>>The entire darc node structure.
>>
>>dude      darc_dude_(da)
>>>A dependence arc for the corresponding DUDe node

| | |
|---|---|
| next | darc_next_(da) |

>The next dependence arc in the set for the corresponding DUDe Node.

| | |
|---|---|
| local_edge | darc_local_edge_(da) |

>Bit Set=> This is a local block dependence edge.

| | |
|---|---|
| flow_edge | darc_flow_edge (da) |

Bit Set=> this arc is a flow edge, not a data dependence edge.

back_edge   darc_back_edge (da)

Bit Set=> This arc points sequentially backwards from the corresponding DUDe node.

removed   darc_removed_(da)

Bit Set=> This dependence arc has been removed by some transformation carry_depth darc_carry_depth_(da)

The depth of the loop which carries this dependence. This value will satisfy the relations $0 <=$ carry level $<=$ next depth. If it is zero, the dependence is within the innermost loop of the next that contains both dude nodes in the dependence.

nest_depth   darc_nest_depth (da)

The depth of the maximal loop next containing both of the dependence nodes connected by this dependence arc. Note that this is the number of entries in the direction vector(s) for this dependence edge.

dv_is_set    darc_dv_is_set_(da)

A bit indicating a valid direction vector is stored in the 'dv' field.

dv    darc_dv_(da)

The direction vector for this dependence. Entries in 'dv' are indexed by values between 1 - and 'next depth', inclusive.

EXAMPLE:

Let's say we have the following FORTRAN program:

program tstmb  real a,b,c,d,e,z if (fondl) then

C = 12.0 /* Def of c is index '1' */

/ ~ DUDe node #1 */ else if (cond2) then

C = 14.1 /* Def of c is index '2' */

/* DUDe node #2 */ else

A = B /* Def of a is index '3' */

/* 'b' is DUDe node #3, 'a' is DUDe node #4 */

C = D+E /* Def of c is index '4' */

/* 'e' is DUDe node #5, 'd' is DUDe node #6, 'c' is DUDe node

7 ~/ endif

```
        z = A+C  /* Def of z is index '5'*/
            /* 'c' is DUDe node #8, 'a' is DUDe node #9, 'z' is DUDe
node #10 */ end
```

Comment:   Yes, the IF tests would also have DUDe nodes associated with them, but for purposes of this example, they don't.

Each Definition gets a bit vector index as shown in the comments. The block structure is similar to:

block 1:
```
    if (a.ge.b) then
    c = 12.0
``` block 2:
```
    if (b.ge.c) then
    c = 14.1
``` block 3:
```
    else
    a = b
    c = d+e
```
block 4:
```
    z = a+c
```

The Flow Graph will be similar to:

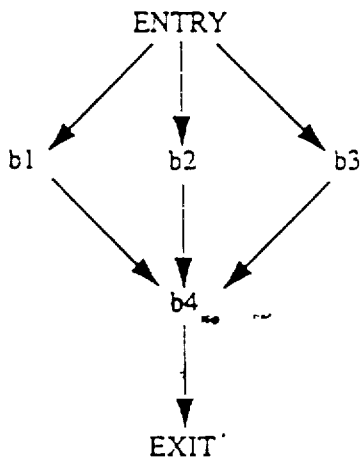

Where b1, b2, b3, & b4 are block 1, block 2, etc.

The dependencies that need to be created in this simple example are:

(where: bvi = Bit Vector Index as assigned in the sample program)

bvi 1 (DUDe #1) "out" set of pointers consist of the use of 'c' in block 4. bvi 2 (DUDe #2) "out" set of pointers consist of the use of 'c' in block 4. bvi 3 (DUDe #4) "out" set of pointers consist of the use of 'a' in block 4. bvi 4 (DUDe #7) "out" set of pointers consist of the use of 'c' in block 4. The use of 'c' (DUDe #8) in block 4 has "in" set of pointers from: bvi 1,bvi2&bvi4. The use of 'a' (DUDe #9) in block 4 has "in" set of pointers from bvi 3. bvi 5 (DUDe #10) Both "in" and "out" set of pointers is NULL (there are no other definitions or uses of 'z' in the program). Each of the uses or definitions has a DUDe node associated with it.

IN THE CLAIMS

Page 16, Claim 7, Line 6, delete "step (d) comprises wherein";

Page 16, Claim 7, Line 6, after "Set" insert -- in step (c);

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A method for constructing a global scalar data dependence graph for an optimizing compiler, the scalar data dependence graph representing relationships among scalar variables in one or more basic blocks that comprises an intermediate representation of a source code program to be executed on a computer processing system, the method of constructing the global scalar data dependence graph comprising the steps of:

(a) performing a prepass on the intermediate representation of the source code program to process symbol information and to process expression information for all of the basic blocks;

(b) building a local data dependence graph for each basic block, the local data dependence graph including one or more dependence nodes;

(c) generating a KILL Set for each dependence node for each basic block;

(d) generating an IN/OUT Set for each dependence node for each basic block; and (e) connecting all of the local data dependence graphs together to form a global scalar data dependence graph.

2. The method of claim 1 wherein step (b) is performed in a single pass through the intermediate representation of the source code program.

3. The method of claim 1 wherein the dependence node is comprised of a data structure defining a definition-use chain, a use-definition chain and a definition-definition chain.

4. the method of claim 1 wherein the dependence node is capable of representing calls, simple, equivalenced, and aggregate variables.

5. The method of claim 1 wherein steps (b) through (e) further comprise the step of performing graph reduction by using conservative estimates for side effects calls and pointer dereferences.

6. The method of claim 1 wherein other information vital to subsequent optimizations is stored in the global scalar data dependence graph, including clear and exposed use bit vectors.

7. The method of claim 1 wherein the definition of a KILL Set in step (c); is expanded to include all definitions that are not generated by the current basic block.

* * * * *

UNITED STATES PATENT AND TRADEMARK OFFICE
CERTIFICATE OF CORRECTION

PATENT NO. : 5,107,418

DATED : April 21, 1992

INVENTOR(S) : Timothy J. Cramer, et al.

It is certified that error appears in the above-identified patent and that said Letters Patent is hereby corrected as shown below:

Column 2, Line 11, delete "difinition" and insert -- definition -- therefore;

Column 6, Line 55, delete "processiang" and insert -- processing -- therefore;

Column 8, Line 38, delete "processiang" and insert -- processing -- therefore;

Columns 7-8, Lines 56-64, delete from "IN THE DRAWINGS" through Column 10, Line 25 ending with the sentence ... page 7, line 16. --therefore.

Column 28, Lines 54 - 58, delete the entire paragraph beginning with "IN THE CLAIMS ..." and ending with the sentence ... in step (c) -- therefore.

Signed and Sealed this

Twenty-first Day of September, 1993

Attest:

*Attesting Officer*

BRUCE LEHMAN

*Commissioner of Patents and Trademarks*